(12) United States Patent
Rosas-Maxemin et al.

(10) Patent No.: US 12,361,339 B2
(45) Date of Patent: *Jul. 15, 2025

(54) SYSTEMS AND METHODS FOR PARKING SPACE SELECTION AND NAVIGATION BASED ON WEIGHTED PARAMETER COMPARISON

(71) Applicant: Pied Parker, Inc., Sacramento, CA (US)

(72) Inventors: Gianni Rosas-Maxemin, Sacramento, CA (US); Robert Mazzola, Sacramento, CA (US); Francisco Sandoval, Sacramento, CA (US); Callam Poynter, Sacramento, CA (US)

(73) Assignee: Pied Parker, Inc., Sacramento, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/315,163

(22) Filed: May 10, 2023

(65) Prior Publication Data

US 2023/0274201 A1    Aug. 31, 2023

Related U.S. Application Data

(63) Continuation of application No. 17/858,494, filed on Jul. 6, 2022, now Pat. No. 11,663,531, which is a continuation of application No. 16/562,455, filed on Sep. 6, 2019, now Pat. No. 11,386,360, which is a continuation of application No. 16/235,805, filed on Dec. 28, 2018, now Pat. No. 11,341,431.

(60) Provisional application No. 62/611,100, filed on Dec. 28, 2017.

(51) Int. Cl.
*G06Q 10/02* (2012.01)
*G06F 3/0482* (2013.01)
(Continued)

(52) U.S. Cl.
CPC .......... *G06Q 10/02* (2013.01); *G06F 3/0482* (2013.01); *G06F 9/451* (2018.02);
(Continued)

(58) Field of Classification Search
CPC ...... G06Q 10/02; G06Q 30/08; G06F 3/0482; G06F 9/451; G06F 16/2425;
(Continued)

(56) References Cited

U.S. PATENT DOCUMENTS

9,552,571 B2    1/2017  Jain
10,176,462 B2   1/2019  Feliberti
(Continued)

*Primary Examiner* — Justin R. Blaufeld
(74) *Attorney, Agent, or Firm* — Straylight LLP (57) ABSTRACT

Parking space selection and navigation systems and methods are disclosed. Computing devices are configured to receive a search request from a user device to secure a first parking space, secure a first parking space for the first user device, determine a first value associated with the first parking space and a second value associated with a second parking space based on listing parameters, determine that the second value is greater than the first value by a predefined amount, and, in response to that determination, transmit a message to the user device comprising a prompt configured to secure the second listing and transmitting a second user-selectable message to a second user device, the second user-selectable message comprising a prompt configured to exchange the second parking space with the first with an incentive for the second user device to exchange parking spaces.

22 Claims, 7 Drawing Sheets

(51) Int. Cl.
  *G06F 9/451* (2018.01)
  *G06F 16/242* (2019.01)
  *G06F 16/2457* (2019.01)
  *G06F 16/29* (2019.01)
  *G06Q 30/08* (2012.01)
  *G08G 1/14* (2006.01)

(52) U.S. Cl.
  CPC .... *G06F 16/2425* (2019.01); *G06F 16/24578* (2019.01); *G06Q 30/08* (2013.01); *G08G 1/143* (2013.01); *G08G 1/144* (2013.01); *G08G 1/145* (2013.01); *G08G 1/148* (2013.01); *G06F 16/29* (2019.01)

(58) Field of Classification Search
  CPC ... G06F 16/24578; G06F 16/29; G08G 1/143; G08G 1/144; G08G 1/145; G08G 1/148
  See application file for complete search history.

(56) References Cited

U.S. PATENT DOCUMENTS

| | | | |
|---|---|---|---|
| 10,540,711 B1 * | 1/2020 | Gau | H04L 51/02 |
| 11,144,848 B2 | 10/2021 | Friedman | |
| 11,250,384 B2 | 2/2022 | Ghosh | |
| 11,341,431 B2 * | 5/2022 | Rosas-Maxemin | G08G 1/143 |
| 2001/0049617 A1 | 12/2001 | Berenson et al. | |
| 2002/0052758 A1 * | 5/2002 | Arthur | G06Q 10/02 705/5 |
| 2003/0162536 A1 * | 8/2003 | Panico | H04W 4/14 340/932.2 |
| 2008/0133284 A1 * | 6/2008 | Birch | G06Q 30/0603 705/5 |
| 2008/0189159 A1 | 8/2008 | Jain et al. | |
| 2009/0083106 A1 | 3/2009 | Bhogal et al. | |
| 2011/0137692 A1 | 6/2011 | Sethna | |
| 2014/0149153 A1 * | 5/2014 | Cassandras | G08G 1/144 705/5 |
| 2014/0195282 A1 | 7/2014 | Stefik et al. | |
| 2014/0278605 A1 * | 9/2014 | Borucki | G06F 9/451 705/5 |
| 2015/0123818 A1 | 5/2015 | Sellschopp | |
| 2015/0262090 A1 | 9/2015 | Hiattj et al. | |
| 2016/0189109 A1 | 6/2016 | Lin et al. | |
| 2016/0379494 A1 * | 12/2016 | Bhuiya | G07B 15/063 701/117 |
| 2017/0213464 A1 * | 7/2017 | Emadi | G06Q 20/322 |
| 2017/0262511 A1 | 9/2017 | Calzada Gomez et al. | |
| 2017/0339084 A1 * | 11/2017 | Zhang | H04L 51/046 |
| 2018/0019960 A1 * | 1/2018 | Perga | H04M 7/006 |
| 2018/0102053 A1 * | 4/2018 | Hillman | G06Q 10/02 |
| 2018/0121833 A1 | 5/2018 | Friedman et al. | |
| 2018/0268617 A1 * | 9/2018 | Bruce | G06Q 10/02 |
| 2018/0374014 A1 * | 12/2018 | Matsui | G08G 1/137 |
| 2019/0205798 A1 | 7/2019 | Rosas-Maxemin et al. | |

* cited by examiner

SYSTEMS AND METHODS FOR PARKING SPACE SELECTION AND NAVIGATION BASED ON WEIGHTED PARAMETER COMPARISON

CROSS-REFERENCE TO RELATED APPLICATIONS

The present application is a continuation application of U.S. application Ser. No. 17/858,494, filed on Jul. 6, 2022, which is a continuation of U.S. application Ser. No. 16/562,455 filed on Sep. 6, 2019, now U.S. Pat. No. 11,386,360, which is a continuation of U.S. application Ser. No. 16/235,805 filed on Dec. 28, 2018, now U.S. Pat. No. 11,341,431, which claims priority to Provisional Application No. 62/611,100 on Dec. 28, 2017, each of which are hereby incorporated by reference in their entireties.

TECHNICAL FIELD

The present disclosure relates generally to wireless device navigation, and more specifically, to securing listings with increased listing value compared to other listings for user devices.

BACKGROUND

Parking a vehicle in densely populated environments is often a frustrating and time-consuming experience, with few available parking spaces and major street congestion. This is especially true in populated urban environments such as the downtowns of large municipalities (e.g., New York City, San Francisco, etc.). Moreover, parking is often in demand near destinations or event venues such as neighborhoods surrounding sports stadiums, concert halls, amusement parks, or beachfronts.

Additionally, the high price of real estate has motivated many property owners to seek out non-traditional ways for property owners to monetize their real property assets. For example, homeowners can often rent out rooms in their homes to tourists or travelers using an online home rental platform; car drivers can provide taxi services using their personal vehicle to pedestrians using a ride sharing platform.

With traditional booking systems, a user may manually search for better parking— finding spaces that may be closer and cheaper. With those systems, the user will have to cancel their current booking and hope that a cheaper and closer space might still be available.

SUMMARY

A parking space selection and navigation system and methods of operation are disclosed. According to one embodiment, a system includes a non-transitory memory and one or more processors coupled thereto; the one or more processors are configured to perform operations comprising: receiving a search request from a first user device to secure a parking space for a vehicle, the search request including one or more listing parameters; securing a first parking space stored in a database based on the search request, the database including a plurality of listings; determining a first listing value for the first parking space based on the one or more listing parameters associated with the first parking space multiplied by one or more weights for corresponding one or more listing parameters; receiving information associated with a second parking space that is secured by a second user device; determining a second listing value for the second parking space based on one or more listing parameters associated with the second parking space multiplied by one or more weights for corresponding one or more listing parameters associated with the second parking space; determining that the second listing value is greater than the first listing value by a predefined value; in response to a determination that the second listing value is greater than the first listing value by the predefined value, transmitting a first message to the first user device associated with the vehicle to register a parking reservation of the second parking space and a second message to the second user device to prompt an exchange the second parking space with the first parking space, wherein the first message and the second message include a deep link; and in response to registering the parking reservation of the second parking space, automatically transmitting information relating to the parking reservation of the second parking space to a navigation application to update a destination associated with the second parking space. According to another embodiment, registering the parking reservation of the second parking space, further comprises releasing a hold on the first parking space such that the first parking space is no longer secured by the first user device. According to yet another embodiment, each of the one or more listing parameters is associated with a respective weight that is configured to be dynamically adjusted using machine learning. According to yet another embodiment, each of the one or more listing parameters associated with the second parking space is associated with a respective weight that is dynamically adjusted in response to the parking reservation of the second parking space. According to yet another embodiment, each of the one or more listing parameters is associated with a respective weight that is dynamically adjusted based on input from a user. According to yet another embodiment, the operations further comprising determining that a threshold amount of time has not elapsed since the parking reservation of the second parking space. According to yet another embodiment, the operations further comprising autonomously navigating the vehicle to the destination associated with the second parking space. According to yet another embodiment, the first message includes a price range. According to yet another embodiment, the first listing value is based on a sum of the one or more weights multiplied by the corresponding one or more listing parameters associated with the first parking space. According to yet another embodiment, the one or more listing parameters include one or more of: proximity of the vehicle to each of the plurality of listings, temporal duration of reservation period, price range for each of the plurality of listings, or a type of listing.

According to another embodiment, a computer-implemented method for facilitating an exchange of parking spaces based on listing value includes, receiving a search request from a first user device to secure a parking space for a vehicle, the search request including one or more listing parameters; securing a first parking space stored in a database based on the search request, the database including a plurality of listings; determining a first listing value for the first parking space based on the one or more listing parameters associated with the first parking space multiplied by one or more weights for corresponding one or more listing parameters; receiving information associated with a second parking space that is secured by a second user device; determining a second listing value for the second parking space based on one or more listing parameters associated with the second parking space multiplied by one or more weights for corresponding one or more listing parameters associated with the second parking space; determining that the second listing value is greater than the first listing value by a predefined value; in response to a determination that the second listing value is greater than the first listing value by the predefined value, transmitting a first message to the first user device associated with the vehicle to register a parking reservation of the second parking space and a second message to the second user device to prompt an exchange the second parking space with the first parking space, wherein the first message and the second message include a deep link; and in response to registering the parking reservation of the second parking space, automatically transmitting information relating to the parking reservation of the second parking space to a navigation application to update a destination associated with the second parking space. According to yet another embodiment, registering the parking reservation of the second parking space further comprises releasing a hold on the first parking space such that the first parking space is no longer secured by the first user device. According to yet another embodiment, each of the one or more listing parameters is associated with a respective weight that is configured to be dynamically adjusted using machine learning. According to yet another embodiment, each of the one or more listing parameters associated with the second parking space is associated with a respective weight that is dynamically adjusted in response to the parking reservation of the second parking space. According to yet another embodiment, each of the one or more listing parameters is associated with a respective weight that is dynamically adjusted based on input from a user. According to yet another embodiment, the first listing value is based on a sum of the one or more weights multiplied by the corresponding one or more listing parameters associated with the first parking space.

According to another embodiment, a non-transitory computer readable storage medium storing one or more programs, the one or more programs comprising instructions, which when executed by a computing system with one or more processors, cause the computing system to execute a method of: receiving a search request from a first user device to secure a parking space for a vehicle, the search request including one or more listing parameters; securing a first parking space stored in a database based on the search request, the database including a plurality of listings; determining a first listing value for the first parking space based on the one or more listing parameters associated with the first parking space multiplied by one or more weights for corresponding one or more listing parameters; receiving information associated with a second parking space that is secured by a second user device; determining a second listing value for the second parking space based on one or more listing parameters associated with the second parking space multiplied by one or more weights for corresponding one or more listing parameters associated with the second parking space; determining that the second listing value is greater than the first listing value by a predefined value; in response to a determination that the second listing value is greater than the first listing value by the predefined value, transmitting a first message to the first user device associated with the vehicle to register a parking reservation of the second parking space and a second message to the second user device to prompt an exchange the second parking space with the first parking space, wherein the first message and the second message include a deep link; and in response to registering the parking reservation of the second parking space, automatically transmitting information relating to the parking reservation of the second parking space to a navigation application to update a destination associated with the second parking space. According to yet another embodiment, the second parking space is initially reserved for another vehicle before the second parking space is reserved for the vehicle, and the method further comprises transmitting a user-selectable message to another user device associated with the another vehicle, the user-selectable message comprising a prompt configured to secure the first parking space for the another vehicle. According to yet another embodiment, the user-selectable message includes an incentive option. According to yet another embodiment, the method further comprises determining that the first listing value is in a first range of listing values and the second listing value is in a second range of listing values.

BRIEF DESCRIPTION OF THE DRAWINGS

In the figures, elements having the same designations have the same or similar functions.

DETAILED DESCRIPTION

Using shared economy parking applications, smartphone owners can use on-demand parking systems to pay property owners for use of their parking space(s). However, applications rely on user input to determine arrival and departure of vehicles in parking spaces, or on expensive sensors. Accordingly, it would be desirable to provide improved methods and systems of providing options to automatically reserve parking spaces with greater value to those smartphone users. The foregoing problems are addressed by aspects of the subject technology that provide systems and methods for identifying better parking options, and for updating a parking reservation based on user configured preferences.

In some aspects, parking space listings (or listings) are compared based on an overall value computed as a function of one or more respective parameters (or listing parameters). A value can refer to a quantified composite value based on numeric and weighted assignments for different parameters. A listing parameter (or parameter) can refer to any quantitative or qualitative characteristic associated with a particular listing. By way of example, parking parameters may include features including, but not limited to: parking space cost, parking space location, parking space size, a distance from the user, and/or booking history, etc. As discussed in further detail below, the calculated value for a particular listing can be based on a function of weighted parameters. Parameter weights may be chosen based on a variety of factors including user-selected settings and/or user reservation history information. In some aspects, parameter weights may be calibrated using a machine-learning method.

In practice, suppose that a user reserved a parking space (e.g., a first listing reservation). Later, it is determined that a second listing is available and that the second listing is potentially more desirable to the user, e.g., because it is cheaper and/or closer to the user's final destination. A software application may be used to filter spaces for instance, that have already been suggested and rejected, spaces which have too low of a user rating, compact spaces, spaces that are too far, and based on other listing parameters. This application may weigh the different listing parameters based on parking spaces the user has reserved historically or based on indicated user preferences. This application may filter parking spaces and then present the user with the option to secure a second, available listing on their smartphone. The user may opt for the second listing, and the first listing then becomes available for another user to secure. In some scenarios, the filtering and comparing may take place on the application server(s) or the smartphone; the smartphone may receive the option to secure the second listing on the smartphone and the application server(s) may receive a response that causes the application server(s) to secure the second listing for the smartphone. The application server(s) could also simply filter, compare, and update the second listing for the smartphone without requiring any input from the smartphone. Once the second listing is secured for the smartphone, the first listing may then be released and become available for other users to secure.

Suppose also that a user reserved a first parking space, when a second parking space with a higher listing value is not available because it is reserved by another, second user. The intelligent parking system may calculate that the second parking space is better for the first user, and offer an option to the first user to reserve the second listing instead. At the same time, the intelligent parking system may also calculate that the first parking space is better for the second user, and offer the option to reserve the first parking space. If both users agree to the exchange, the reservations are swapped. In such a way, better parking options may be provided through the intelligent parking system to a greater number of users. In practice, suppose that the second user liked his current listing reservation more than the first listing option. The intelligent parking system may offer incentives to the second user to encourage the second user to exchange listing reservations with the first user—incentives such as a coupons or credits.

Such intelligent parking systems increase efficiency with respect to parking, reduce traffic, reduce accidents, diminish or eliminate the need for vehicle operator (i.e., user) input, more accurately predict parking needs, and lead to faster processing of parking transactions. By shortening the time spent looking for parking for drivers, less cars will be on the road looking for parking, significantly decreasing traffic. Furthermore, intelligent parking systems decrease walking distance for users from their parking spot to their destination and decrease costs associated with parking.

In some embodiments, a listing value refers to a metric for quantifying a listing's relative value compared with other listings. In some examples, a listing value may be on a scale of 1-100. A particular listing value may be calculated based on parameters and weights. In some examples, the listing value is a weighted sum of the parameters and associated weights. Each parameter, which is a quantitative or qualitative characteristic, may be related to characteristics such as proximity to the physical location of a second location, such as a user location or point of interest; an availability time, proximity of availability time to another reference time, a type of listing, dimensions associated with listings, dimensions of vehicles associated with respective user devices, information about any hazards, whether or not the listing has a garage, information about price and time, such as price per hour, price for various times during a day, price per day, price per week/month/year; relative size, a price range, whether or not the listing has an over-head cover, whether or not the listing is an electric vehicle (EV) charging station; past, current, and/or future demand for the listing; a user rating, such as 1-5; whether parking enforcement is available, the responsiveness of parking enforcement, and/or the like and/or a combination thereof. In some examples, a parameter's value may be binary (i.e., 0 or 1) depending on whether a particular characteristic is associated with a listing or not. In some examples, a parameter's value may be an integer (e.g., 1, 2, 3, etc.), for example, each type of listing may be assigned an integer: a compact space may be valued as 1, an SUV-sized space may be valued as a 2, a large truck space may be valued as a 3, and so on. In some examples, a parameter such as price may have a parameter value in dollars; such parameter may be weighted by a multiplier that, when applied to the parameter value (i.e., the amount of dollars), it equals some number which, when added with other numbers that are related to other parameters and weights, equals the listing value. Listing value calculations are further described in the discussion of FIG. 5.

In some embodiments, weights that are applied to parameters may be preconfigured by an administrative system or application server, may be user selectable, and/or adjusted by machine-learning algorithms using data from previously reserved listings. Weight value calculations are further described in the discussion of FIG. 5.

Figure 1:
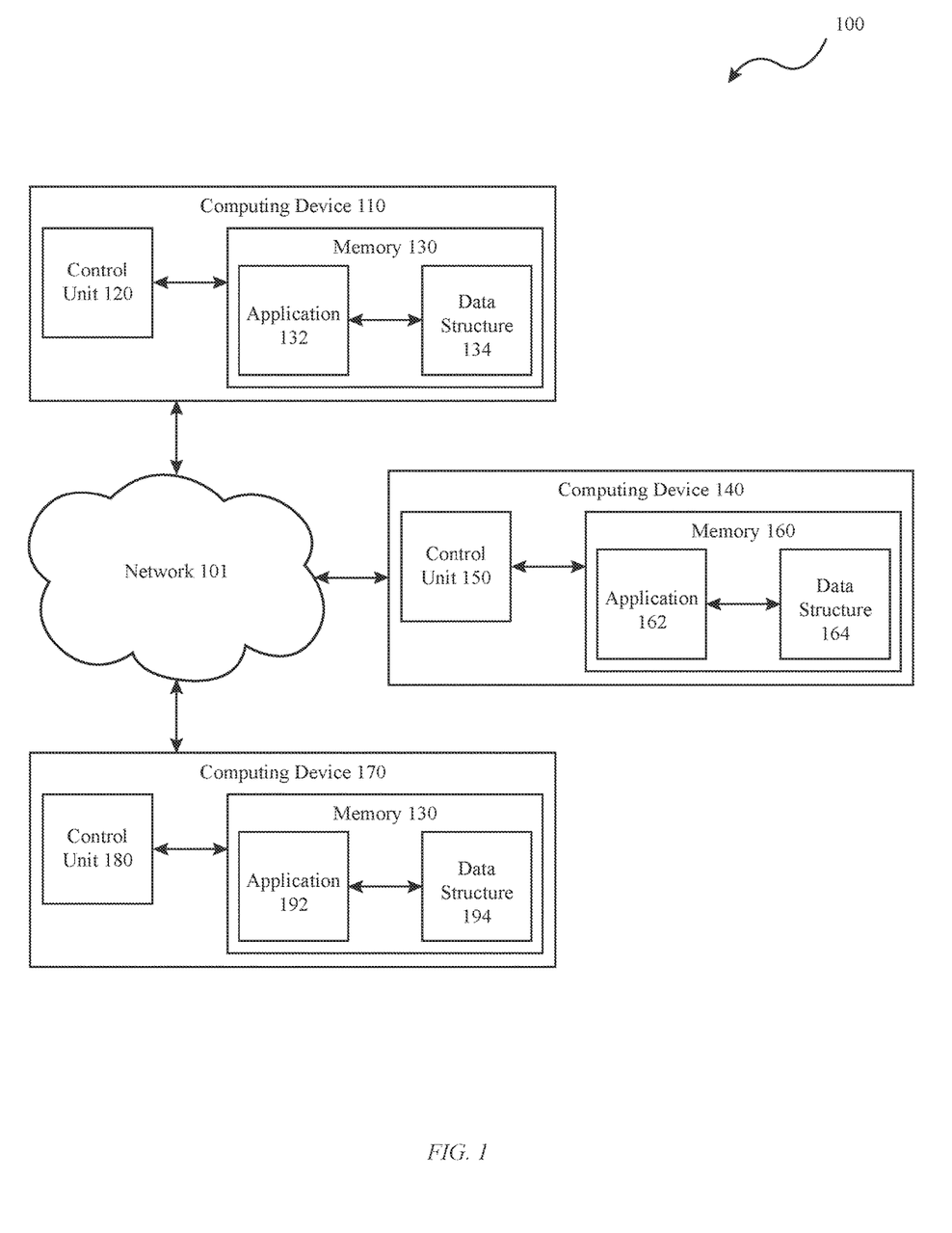
FIG. 1 is an example diagram of a distributed computing system according to some embodiments.

FIG. 1 is a simplified diagram of a distributed computing system 100 according to some embodiments. As shown in FIG. 1, system 100 includes three computing devices 110, 140, and 170. One of ordinary skill would appreciate that distributed computing system 100 may include any number of computing devices of various types and/or capabilities. In some embodiments, computing devices 110, 140, and/or 170 may be any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned.

In some embodiments, computing device 110 includes a control unit 120 coupled to memory 130; computing device 140 includes a control unit 150 coupled to memory 160; and computing device 170 includes a control unit 180 coupled to memory 190. Each of control units 120, 150, and/or 180 may control the operation of its respective computing device 110, 140, and/or 170. In some examples, control units 120, 150, and/or 180 may each include one or more processors, central processing units (CPUs), graphical processing units (GPUs), virtual machines, microprocessors, microcontrollers, logic circuits, hardware finite state machines (FSMs), digital signal processors (DSPs) application specific integrated circuits (ASICs), field programmable gate arrays (FPGAs), and/or the like and/or combinations thereof. In some examples, memory 130 may be used to store one or more applications and one or more data structures, such as application 132 and data structure 134. In some examples, memory 160 may be used to store one or more applications and one or more data structures, such as application 162 and data structure 164, and memory 190 may be used to store one or more applications and one or more data structures, such as application 192 and data structure 194.

In some embodiments, memories 130, 160, and/or 190 may each include one or more types of machine-readable media, including volatile and non-volatile memory. Some common forms of machine-readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retain data while devices are powered, potentially losing the memory when the devices are not powered.

The data structures 134, 164, and/or 194 may vary in size, usage, and/or complexity depending upon the purposes of computing devices 110, 140, and/or 170 and/or applications 132, 162, and/or 192. In some embodiments, when computing devices 110, 140, and/or 170 are network switching devices, such as switches, routers, hubs, bridges, and/or the like, the data structures 134, 164, and/or 194 may include one or more tables with forwarding and/or similar information. In some examples, these tables may include one or more virtual local area network (LAN) tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110, 140, and/or 170 these tables may include anywhere from a few dozen entries to thousands, or even tens of thousands or more entries. In some examples, data from data structures 134, 164, and/or 194 may be retrieved, stored, or modified by a respective control unit in accordance with instructions which may be executed directly, e.g., machine code, or indirectly, e.g., scripts, by the respective control unit. The systems and methods of the present disclosure are not limited to any particular data structure.

In some embodiments, computing devices 110, 140, and 170 may also be coupled together using a network 101. In some embodiments, one or more of computing devices 110, 140, and 170 may be connected via any type of wired or wireless connections, such as dedicated short-range communications (DSRC), satellite, radio-frequency identification (RFID), fire wire, network, USB, Wi-Fi, RFID, BLUETOOTH, Near Field Communication (NFC), Infrared (e.g., GSM infrared), and/or the like and/or using any suitable wireless communication standards and protocols, such as IEEE 802.11 and WiMAX. Network 101, including any intervening nodes, may be any kind of network including a LAN, such as an Ethernet, a wide area network (WAN) such as an internet, a virtual or non-virtual private network, and/or the like and/or combinations thereof.

In some embodiments, network 101 may include any type of computing device including personal computers (e.g., laptop, desktop, smartphone, or tablet computers), servers (e.g., web servers, database servers), network switching devices (e.g. switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned. Computing devices 110, 140, and 170 through their applications, such as applications 132, 162, and/or 192, may use network 101 to exchange information and/or to provide services for each other. In some examples, computing device 140 may be used to provide backup and/or fail over services for computing device 110. In some examples, computing device 140 may be maintaining data structure 164 as a synchronized copy of data structure 134. In some examples, one or more of components of computing devices 110, 140, and 170, such as a control unit, may be located remotely.

In some embodiments, computing devices 110, 140, and/or 170 may include an electronic display, the display may be an active matrix emitting diode (AMOLED), light-emitting diode (LED), organic LED (OLED), electrophoretic, liquid crystal, e-paper, and/or the like and/or combinations thereof.

In some embodiments, computing devices 110, 140, and/or 170 may include various input and output (I/O) devices, such as a keyboard, a mouse, touchscreen, button inputs, microphone, motion sensor, eye sensor, video display, and/or the like.

Figure 2:
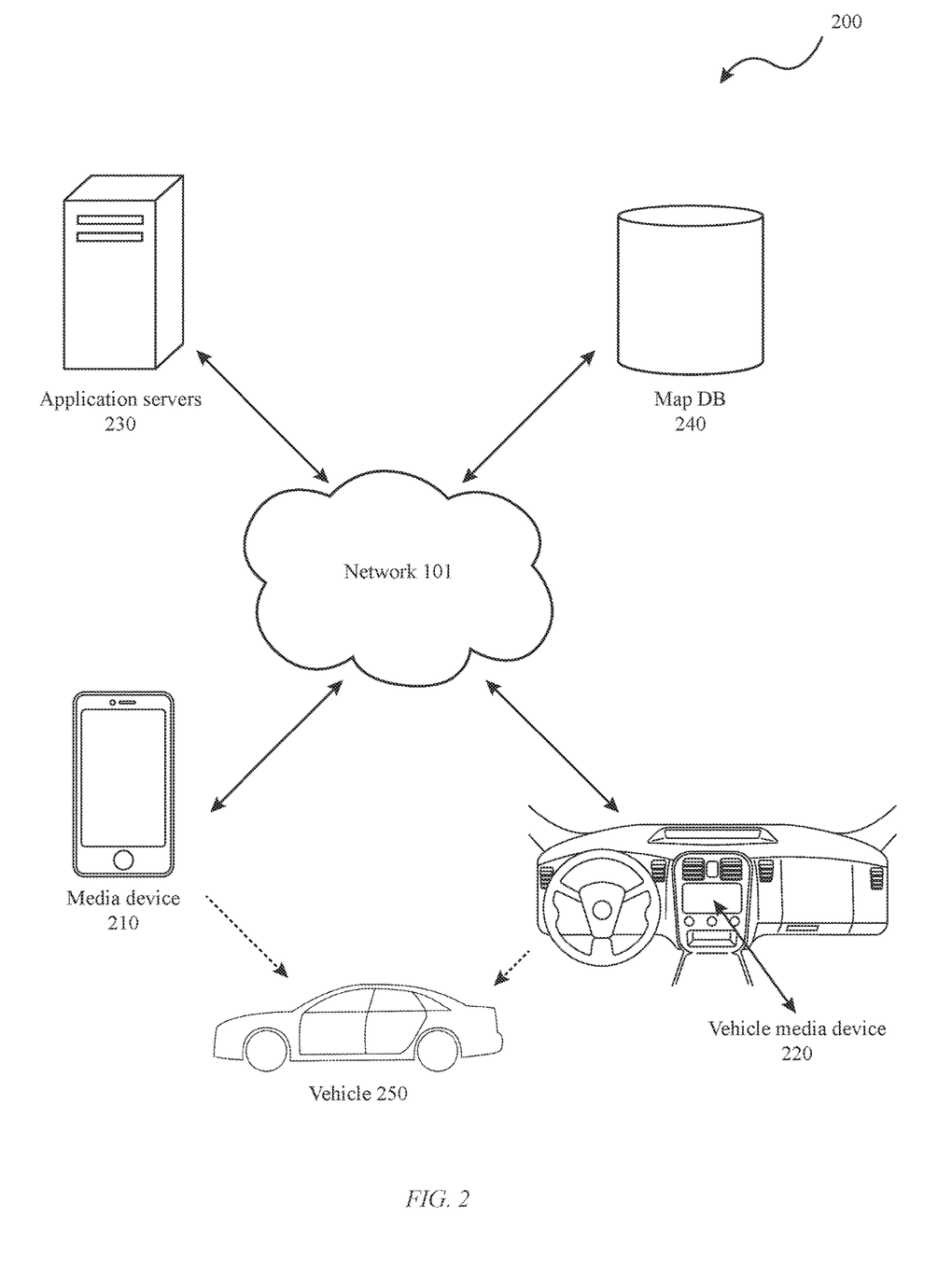
FIG. 2 is an example diagram of a distributed computing network according to some embodiments.

FIG. 2 is a simplified diagram of a distributed computing system 200. In some embodiments, as shown in FIG. 2, system 200 includes media device 210, vehicle media device 220, application servers 230, map database 240, and vehicle 250. In some examples, media device 210 and/or vehicle media device 220 may correspond to one or more of computing devices 110, 140, 170 and may be in communication with one another using network 101.

In some embodiments, vehicle media device 220 may be a device within vehicle 250, or may be part of the vehicle itself, such as an on-board vehicle computer. The vehicle may have more than one computing device. In some examples, vehicle media device 220 may be mounted inside a vehicle, such as to a dashboard of the vehicle. In some examples, the vehicle may be any type of vehicle, including a car, truck, SUV, motorcycle, scooter, SEGWAY, hoverboard, drone, bus, golf cart, train, trolley, amusement vehicle, recreational vehicle, boat, watercraft, helicopter, airplane, bicycle, and/or the like.

In some embodiments, media device 220 may include a display within a housing. In some examples, the housing may include several parts. In some examples, one part of the housing may include an optically transparent material, such as glass, and another part of the housing may include other materials, such as metallic materials, e.g., aluminum, and/or plastic, which may provide a robust support structure to prevent deformation of the display.

In some embodiments, vehicle media device 220 may establish communication with media device 210, or vice versa. In some examples, media device 210 automatically establishes communication with vehicle media device 220, such as by connections between one or more of computing devices 110, 140, and 170. In some examples, media device 210 is automatically in communication with vehicle media device 220 via wired connection. In some examples, media device 210 may contain its own power supply, or may be powered by a power supply within vehicle 250. In some examples, vehicle may charge media device 210's while in operation. In some examples, media device 210 may be charged wirelessly, e.g., on a wireless charging surface, such as on a dashboard of vehicle 250. Vehicle 250 may contain a transmitter for providing energy transmission and media device 210 may have a receiver for wireless power, whereby energy transfer occurs using magnetic resonant coupling.

The transmitter may transmit power using multiple transmit coils and using parallel paths from such coils to multiple receive coils in the receiver.

In some embodiments, vehicle 250 may be remotely controlled, partially or totally autonomous, such as partially or totally autonomous vehicle systems and methods disclosed in U.S. Pat. No. 9,330,571, which is incorporated by reference in its entirety. In some examples, vehicle 250 may contain one or more vehicle operation sensors. In some examples, media device 210 and vehicle media device 220 may be included as vehicle operation sensors and may be configured to communicate with the one or more external sensors. External sensors may include cameras, lasers, sonar, radar detection units (e.g., ones used for adaptive cruise control), and/or the like and/or combinations thereof, and may provide data updated in real-time, updating output to reflect current environment conditions. Object detection and classification for autonomous vehicles may be performed according to embodiments disclosed in U.S. Pat. No. 8,195,394, which is incorporated by reference in its entirety.

In some embodiments, data may also be collected from other sources, including one or more application servers 230. In some examples, traffic data may be received by one or more application servers, which may include a geolocation, mapping, and navigation application such as GOOGLE MAPS, APPLE MAPS, WAZE, and/or the like and/or combinations thereof. In some examples, application servers 230 can interact with a map or GIS database, such as map database 240, through a map application programming interface (API) such as the GOOGLE MAPS API. In some examples, the application servers query the map or GIS database for traffic data in response to receiving the sensor data from the media device and/or host device. In some examples, map database 240 can be an SQL database. The application servers 230 can interface with one or more servers managing the SQL database. Application data and application states can be stored in a cloud managed SQL database. In some examples, map database 240 can be a document-oriented database including a NoSQL database such as a MONGODB database.

Figure 3:
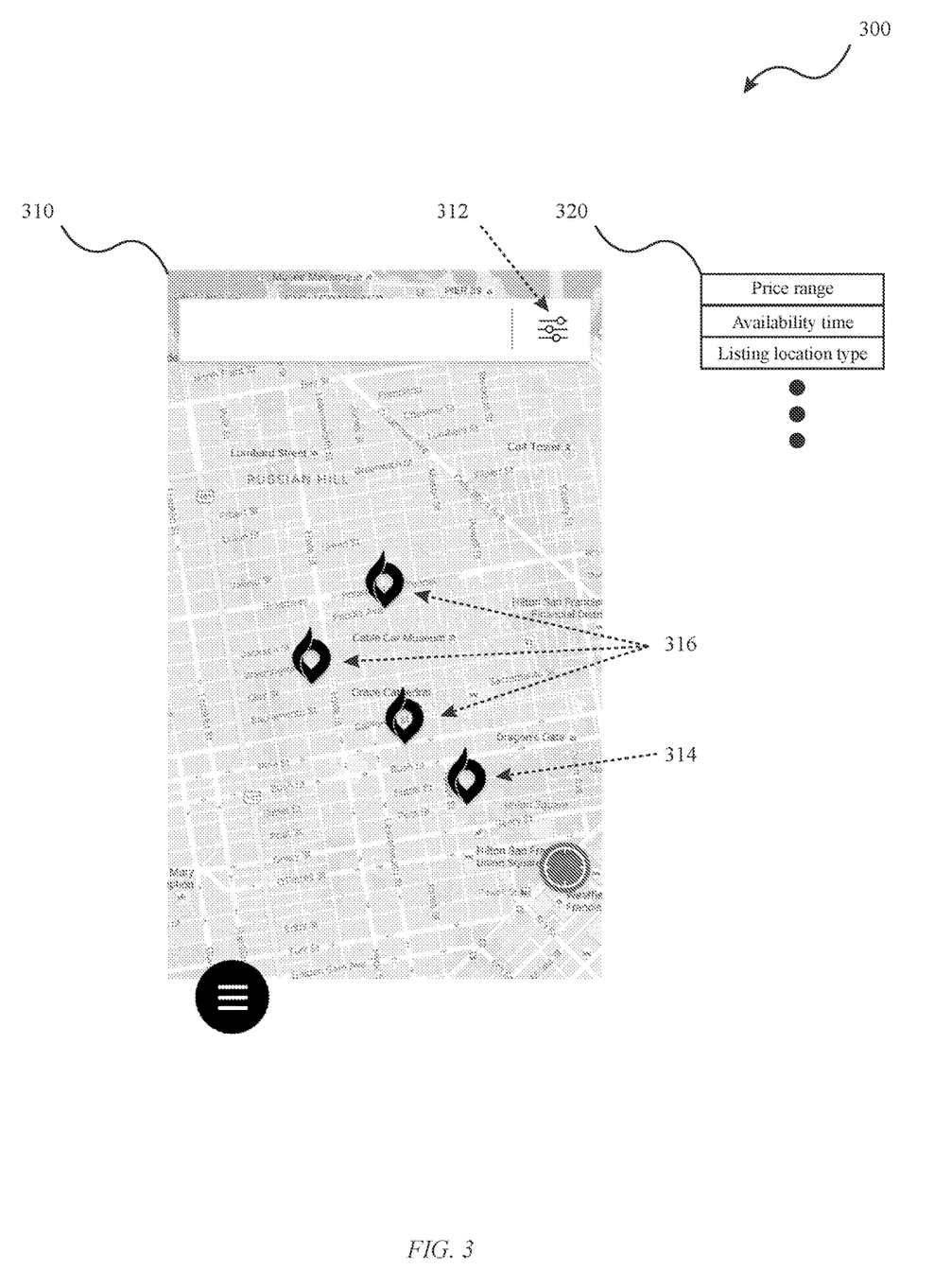
FIG. 3 is an example system with a user interface for presenting one or more listings on a map displayed on a device.

FIG. 3 is an example system 300, illustrating a user interface for presenting one or more listings on a map displayed on a wireless device, which may correspond to one or more of computing devices 110, 140, 170, media device 210, vehicle media device 220. In some examples, the wireless device may include one or more sensors, such as those sensors discussed above with respect to FIG. 2. In some examples, graphical user interface (GUI) 310 includes a map with a plurality of GUI objects that may be filtered based on preset information or data concerning listings previously requested by the first user device and/or based on listing parameters such as a proximity to the physical location of a second location, such as a user location or point of interest; an availability time, proximity of availability time to another reference time, a type of listing, dimensions associated with listings, dimensions of vehicles associated with respective user devices, information about any hazards, whether or not the listing has a garage, information about price and time, such as price per hour, price for various times during a day, price per day, price per week/month/year; relative size of listings, a price range, whether or not the listing has an over-head cover, whether or not the listing is an electric vehicle (EV) charging station; past, current, and/or future demand for the listing; a user rating, whether parking enforcement is available, the responsiveness of parking enforcement, and/or the like and/or a combination thereof. In some examples, demand may be quantified based on vehicles entering and exiting a listing, based on a number of users securing listings, based on probabilities that particular listings might be available at a certain time, based on particular destination paths of users, and/or the like and/or a combination thereof.

In some embodiments, GUI 310 includes a map with GUI object 312, first listing 314, and second listings 316. In some examples, GUI object 312 may be selected, and in response to the selection of GUI object 312, a list of items 320 is displayed, including one or more parameters by which the map of listings may be filtered. In some examples, an item from list of items 320 is selected and an input is entered into a field. In some examples, selections are made via user input. In some examples, selections are made automatically without user input. In response to the input, listings matching the selected parameters entered in one or more fields of list of items 320 may be determined. In response to the determination, listings within a map region are displayed on GUI 310. The map region may correspond with the current map frame, or may correspond with a certain radius from a current location of a wireless device included in system 300.

In some embodiments, an item from list of items 320 corresponding to price range is selected. A price range of $3-$5 is entered into a field corresponding to the selected item. A plurality of listings displayed on the map is filtered according to the selected price range. In some examples, first listing 314 has an associated price within the selected price range, and second listings 316 do not have an associated price within the selected price range. As a result, second listings 316 are not displayed on the map, and only first listing 314 and other listings with associated prices within the selected price range are displayed on the map. Other parameters and scenarios for filtering listings that may be displayed on the wireless device of system 300 are within the scope of disclosed embodiments.

Figure 4:
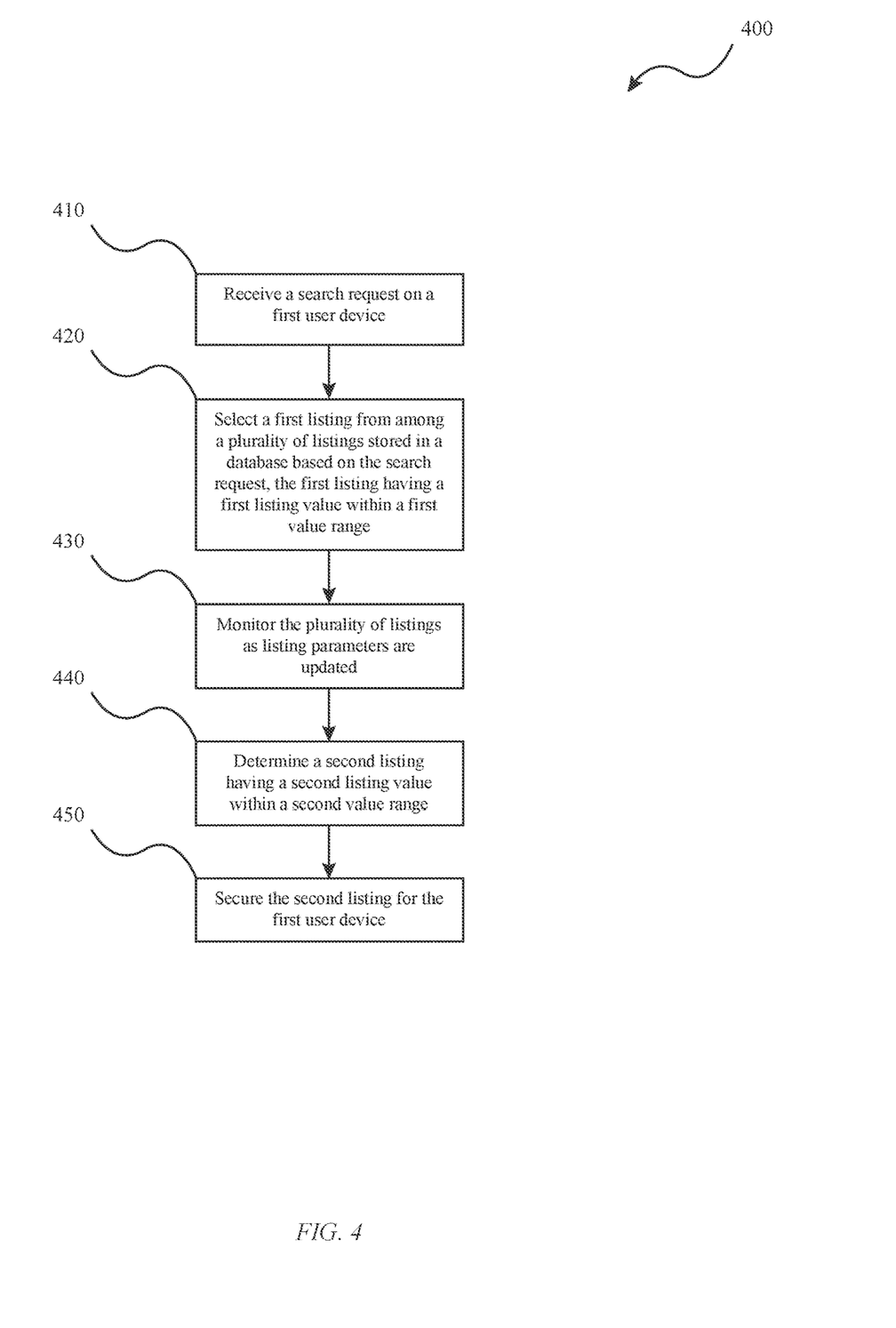
FIG. 4 is a flowchart illustrating an example method securing a first listing for a first user device, determining a second listing has a second listing value within a range different than the first listing, and securing the second listing for the first user device.

FIG. 4 is a flowchart illustrating an example method 400 for securing a first listing for a first user device, determining a second listing has a second listing value within a range different than the first listing, and securing the second listing for the first user device. Method 400 is illustrated in FIG. 4 as a set of processes 410-450. In some examples, processes 410-450 may be implemented on one or more application servers, such as application servers 230. In some examples, not all of the illustrated processes may be performed in embodiments of method 400. Additionally, one or more processes not expressly illustrated in FIG. 4 may be included before, after, in between, or as part of processes 410-450. In some embodiments, one or more processes 410-450 may be implemented, at least in part, in the form of executable code stored on non-transitory, tangible, computer readable media that when run by one or more processors (e.g., a processor of the media device) may cause the one or more processors to perform one or more of processes 410-450. In some examples, the first wireless device may correspond to one or more of computing devices 110, 140, 170, media device 210, and/or vehicle media device 220, one or more sensors may include those sensors discussed above with respect to FIG. 2, and system 300.

During a process 410, a search request from a first user device may be received. In some examples, the search request includes a request to secure a first listing. In some examples, before process 410, a map of listings may be displayed on a GUI of the first user device, such as GUI 310. In some examples, the search request may also include location data provided by the first user device, such as global positioning system (GPS) coordinates and/or an address. In some examples, a search request may be sent by the first user device in response to activation of augmented reality (AR) or mixed reality (MR) system. In some examples, a search request may be generated automatically. In some examples, a search request is sent on a first user device in response to input, that may include touch, hand movement, voice activation, and/or the like. In some examples, the search request includes one or more listing parameters. In some examples, the search request may include location data provided by the first user device, such as GPS coordinates and/or an address. The map of listings may be filtered based on preset information or data concerning listings previously requested by the first user device and/or based on listing parameters such as a proximity to the physical location of a second location, such as a user location or point of interest; an availability time, proximity of availability time to another reference time, a type of listing, dimensions associated with listings, dimensions of vehicles associated with respective user devices, information about any hazards, whether or not the listing has a garage, information about price and time, such as price per hour, price for various times during a day, price per day, price per week/month/year; relative size of listings, a price range, whether or not the listing has an over-head cover, whether or not the listing is an EV charging station; past, current, and/or future demand for the listing; a user rating, whether parking enforcement is available, the responsiveness of parking enforcement, and/or the like and/or a combination thereof.

During a process 420, a first listing is selected from among a plurality of listings based the search request. In some examples, one or more application servers contain a database of listings. In some examples, the database of listings may be pooled from a plurality of sources, such as city-provided data, cross-platform databases, and/or the like. In some examples, one or more listings are secured by one or more wireless devices, and servers store information about each wireless device and the corresponding secured listing. In some examples, following selection of the first listing selection, the first user device is sent a confirmation query. In some examples, following selection of the first listing selection, information about the first listing selection, such as the time and address, are synchronized to a calendar belonging to a respective user of the first user device, such as GOOGLE CALENDAR. A related reservation may be automatically scheduled at such time and address, such as scheduling a ride using a ride sharing application. In some examples, the first listing is selected based on listings that match one or more listing parameters included in the search request, including preset information or data concerning listings previously requested by the first user device, listing parameters such as a proximity to the physical location of a second location, such as a user location or point-of-interest; an availability time, proximity of availability time to another reference time, a type of listing, dimensions associated with listings, dimensions of vehicles associated with respective user devices, information about any hazards, whether or not the listing has a garage, information about price and time, such as price per hour, price for various times during a day, price per day, price per week/month/year; relative size of listings, a price range, whether or not the listing has an over-head cover, whether or not the listing is an EV charging station; past, current, and/or future demand for the listing; a user rating, whether parking enforcement is available, the responsiveness of parking enforcement, and/or the like and/or a combination thereof. In some examples, a first listing is selected and confirmed without further response from the first user device. In some examples, the first listing selected may have a first listing value within a first value range. Calculations of assigned listing values and ranges are elaborated upon further in discussion of FIG. 5.

During a process 430, the database of listings is monitored as listings parameters are updated. In some examples, the listing parameters, such as availability times are updated as reservations are cancelled and scheduled for listings in real time. In some examples, reservations may be held temporarily while a listing is in the process of being secured. In some examples, the database of listings is updated continuously, periodically, and/or at set location markers, including upon departure of one or more wireless devices.

During a process 440, a second listing is determined to have a second listing value within a second value range. In some examples, the second value range is based on previously secured listings and associated listing parameters. In some examples, the second listing has a second assigned value within a second value range. In some examples, the first and second assigned values are determined based on respective listing parameters and respective weights assigned to each parameter. Calculations of assigned listing values and ranges are elaborated upon further in discussion of FIG. 5.

During a process 450, the second listing is secured for the first user device. In some examples, the first listing is no longer secured for the first user device, and is listed as available. In some examples, a calendar event is updated for the calendar belonging to a respective user of the first user device, including information such as a time an address of the second listing.

Figure 5:
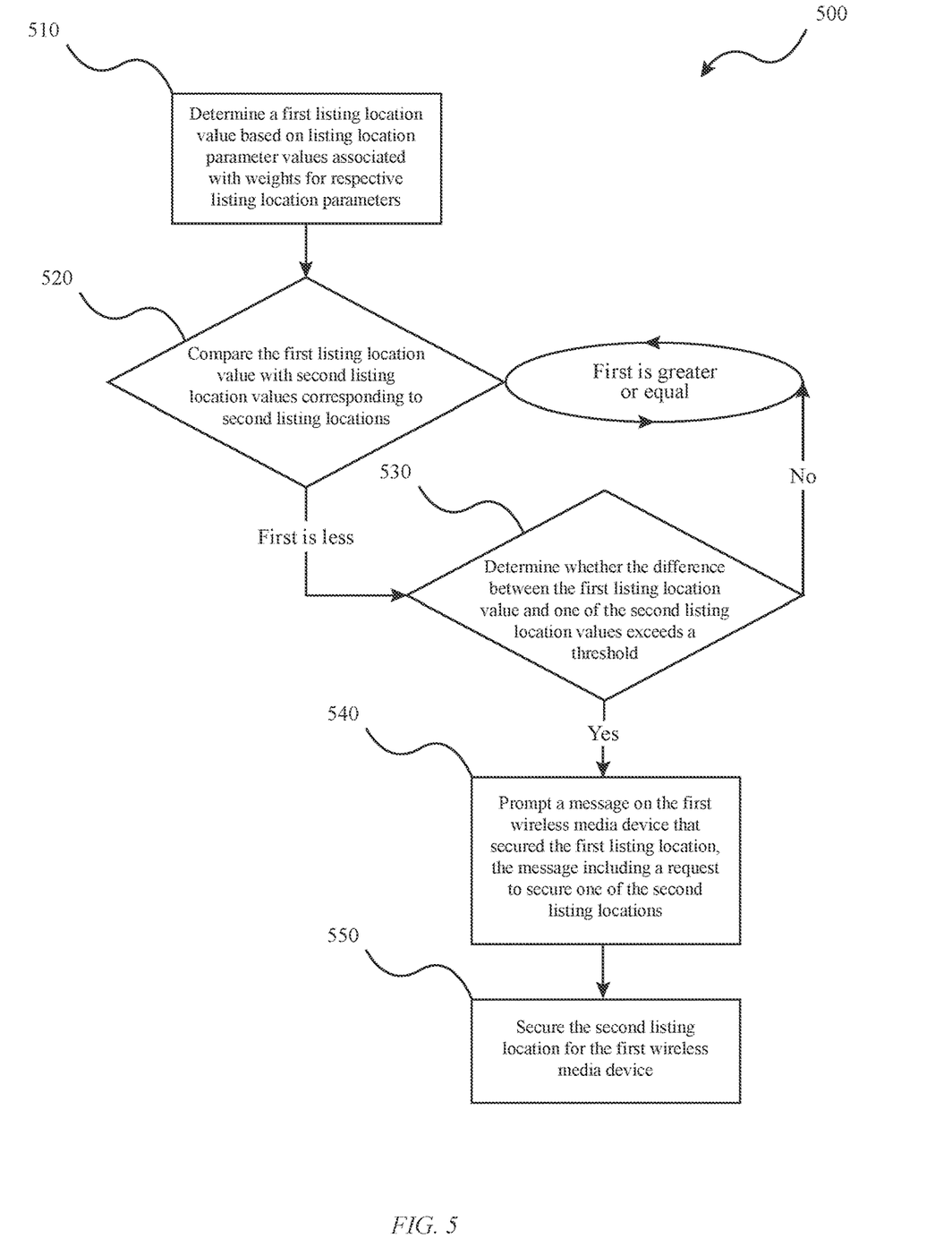
FIG. 5 is a flowchart illustrating an example method for determining listing values for respective listings and securing listings with increased listing value.

FIG. 5 is a flowchart illustrating an example method 500 for determining listing values for respective listings and securing listings with increased listing value. Method 500 is illustrated in FIG. 5 as a set of processes 510-550. In some examples, processes 510-550 may be implemented on one or more application servers, such as application servers 230. In some examples, not all of the illustrated processes may be performed in embodiments of method 500. Additionally, one or more processes not expressly illustrated in FIG. 5 may be included before, after, in between, or as part of processes 510-550. In some embodiments, one or more processes 510-550 may be implemented, at least in part, in the form of executable code stored on non-transitory, tangible, computer readable media that when run by one or more processors (e.g., a processor of the media device) may cause the one or more processors to perform one or more of processes 510-550. In some examples, the first wireless device may correspond to one or more of computing devices 110, 140, 170, media device 210, and/or vehicle media device 220, one or more sensors may include those sensors discussed above with respect to FIG. 2, and system 300.

During a process 510, a first listing value is determined for a first listing based on one or more listing parameter values associated with the first listing and one or more weights for one or more respective listing parameters. In some examples, the one or more weights for one or more respective listing parameters are determined based on user preferences and/or previously secured listings. In some examples, the one or more listing parameter values are determined based on quantitative or qualitative characteristics associated with the listing, such characteristics including a proximity to the physical location of a second location, such as a user location or point of interest; an availability time, proximity of availability time to another reference time, a type of listing, dimensions associated with listings, dimensions of vehicles associated with respective user devices, information about any hazards, whether or not the listing has a garage, information about price and time, such as price per hour, price for various times during a day, price per day, price per week/month/year; relative size of listings, a price range, whether or not the listing has an over-head cover, whether or not the listing is an EV charging station; past, current, and/or future demand for the listing; a user rating, whether parking enforcement is available, the responsiveness of parking enforcement, and/or the like and/or a combination thereof.

A first listing value can be determined based on a summation of the one or more weight values multiplied by the one or more respective listing parameter values. In some examples, the relationship of a listing's value and one or more weights associated with respective listing parameters and the one or more listing parameter values may be:

$$\sum_n S_n w_n = y \quad (1)$$

wherein y is the listing value, n is an index indicating a particular listing parameter, Sn is the value for the n-th listing parameter, and Wn is the weight associated with the n-th listing parameter.

In some embodiments, the relationship of a listing's value and one or more weights associated with one or more respective listing parameters and the one or more listing parameter values may be:

Listing Value=Proximity*W1+User_Rating*W2+
Time_proximity*W3+Size*W4+Price*W5 . . .
SN*WN, (2)

wherein the Listing Value is a summation of the weights 1 through N multiplied by the respective listing parameter values; W1 is weight one, which may multiply by the proximity parameter; W2 is weight two, which may multiply by the user rating parameter, and may be on a scale of 1 to 5 for instance, W3 is weight three, which may multiply by the time proximity parameter, and may be a time window of 15 to 30 minutes, in which earlier or later availability may be permitted; W4 is weight four, which may multiply by the size parameter; and WN is the n-th weight, which may be associated with listing parameter value, Sn. In some examples, the proximity parameter is a distance between the listing's physical location and the physical location of the first user device. In some examples, the proximity parameter is a distance between the listing's physical location and the physical location of a destination of the first user device or some other location. In some examples, W1 is weighted relative to a maximum distance, such as five miles, and may correspond to an applicable geographic area for listings. In some examples, a parameter's value may be binary (i.e., 0 or 1) depending on whether a particular characteristic is associated with a listing or not. In some examples, a parameter's value may be an integer (e.g., 1, 2, 3, etc.), e.g., the Size parameter value may be assigned an integer depending on the parking space type: a compact space may be valued as 1, an SUV-sized space may be valued as 2, a large truck space may be valued as 3, and so forth in a similar manner. In some examples, a parameter such as Price may have a parameter value in dollars, (e.g., $4.55), or some other currency. In some examples, the Listing Value is between 1-100, and weights one through N may be weighted in order to be less than 100, such that the Listing Value may be a relative indicator of value compared with other listings. In some examples, one more weight values W1 through WN may be user configurable and/or adjusted by machine learning with inputs from past listing reservations. In some examples, a user may indicate that one or more listing parameters are more important than others, and the corresponding weight may be increased or decreased accordingly. In some examples, a user may indicate that distance is unimportant, and correspondingly, weight one may be diminished to zero or near zero value. Similarly, a user may indicate that a parameter Sn is unimportant, and then WN may be diminished to zero or near zero value. In some examples, a user may indicate that a parameter Sn is important, and then WN may be kept the same or adjusted based on the user input. In some examples, a user may indicate that a parameter Sn is dispositive, such that a listing must have a 5 minute walking distance from a destination. In some examples, a user may indicate that a parameter Sn is dispositive such that no other factor matters, such that if a listing is found that accommodates trucks, the algorithm will automatically assign this listing with the highest value.

In some examples, one or more machine learning algorithms may be implemented to adjust weights in order to predict more accurately what listings have increased relative value to a particular user or user device. In some examples, the determination of a listing's listing value may be performed using a machine learning (ML) model that may be trained/tuned based on training data collected based on positive recognition, false recognition, and/or other criteria, such as a comparison to another listing. Although various types of machine learning models may be deployed to refine some aspects for determining a listing's listing value, in some aspects, one or more ML based classification algorithms may be used. Such classifiers may include but are not limited to: a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the ML models may be configured to perform various types of regression, for example, using one or more various regression algorithms, including but not limited to: a Stochastic Gradient Descent Regressor, and/or a Passive Aggressive Regressor, etc.

During a process 520, the first listing value is compared with one or more second listing values corresponding to one or more second listings. In some examples, the second listing values are stored on one or more application servers in a database. In some examples, the second listing values are previously determined based on one or more listing parameter values and one or more weights for one or more respective listing parameters similar to process 510. As listing parameters are updated in real time for respective listings, process 520 may be repeated continuously, periodically, and/or at set location markers, including upon listings becoming available.

During a process 530, it is determined whether the difference between the first listing value and one of the second listing values exceeds a predetermined threshold. In some examples, the one or more machine learning algorithms may be used to filter listing values with higher listing values than the currently secured listing for a particular wireless device. In some examples, a first listing may be secured by the first wireless device and it is determined that there is a second listing with a higher listing value. At the same time, it is determined that the difference between the first listing value and the second listing value is below a predetermined threshold, such as 1-5%, a listing differential threshold. In some examples, the first listing value is 64, and the second listing value is 66, which is only a 3.2% increase in listing value. The second listing value may be filtered because it is within a first range of values, such as being less than a 5% increase in listing value. In some examples, the listing differential threshold may be at least 1%. In some examples, if it is determined that one of the second listings does not exceed the threshold, then the method does not proceed to process 540. In some examples, threshold is user configurable. In some examples, the threshold is dependent on weights. In some examples, the threshold may be time dependent. In some examples, if the time between the securing of the first listing and the current time is less than a time threshold, e.g., 5-10 minutes, then the method does not proceed to process 540.

In some embodiments, a threshold for difference in listing value is not necessary because factors for the threshold are taken into account in the weighting of listing parameters. In some examples, one or more weights for listing parameters are time dependent, and may increase, decrease, or stay the same accordingly. In some examples, when a user is securing a listing very close to the start time of the listing reservation, the weight associated with time proximity may be significantly increased. In some examples, there is a hierarchy of range values. The first listing value may be within a first range of values. There may be a second range of values for which when it is determined that one of the second listing values in such range, that the method proceeds to process 540.

Some advantages of disclosed embodiments include providing smartphone users with listings that are of increased listing value. Further, listings of increased value may be filtered when such listings are only slightly higher (e.g., <5%) than the currently secured listing or when the currently secured listing was very recently (e.g., <10 minutes) secured. This may prevent a smartphone user from being bothered when a parking space opens up that is only marginally better than the parking space they have reserved.

During a process 540, in response to determining that the difference exceeds the predetermined threshold, a user-selectable message may be provided on the first wireless device that secured the first listing, the user-selectable message comprising a prompt to secure the second listing. In some examples, the user-selectable message includes a link. In some examples, the link is a deep link, such as a uniform resource identifier (URI) that launches a resource within a second software application. A deep link enables the first wireless device to launch a second application to a relevant portion within the second application without having to separately launch the second application and navigate to that relevant portion.

During a process 550, the second listing is secured by the first wireless device. In some examples, a database of listings is updated in response to process 550. In some examples, process 550 may correspond with process 450.

In some embodiments, the method 500 may be repeated starting with process 520. In some examples, the listing secured by a particular user may be updated as a wireless device corresponding with the user approaches a destination. In some examples, a particular wireless device may deviate from an expected path, and the time expected to reach the destination may be updated; the listing secured by the wireless device is swapped for a listing that is closer in time to the time in which the wireless device is expected to reach the destination.

In some embodiments, in response to securing the second listing, one or more machine learning algorithms adjust the one or more weights (as discussed above with respect to process 510) to predict more accurately what listings have increased relative value to a particular user. The one or more machine algorithms may adjust the one or more weights based on the second listing value parameters and the listing parameter values of previously secured listings. The one or more machine learning algorithms may adjust the one or more weights for groups of wireless devices or for individual wireless devices.

Some advantages of disclosed embodiments include providing listings to particular smartphone users that are more suitable to that user's needs. For example, a smartphone user may have already secured a parking space through a smartphone application, but may want the option to secure an even better parking space. That smartphone user, for instance, may want a parking spot that is cheaper and closer, and may opt-in for automatic bids for a listing that is more suitable for an associated vehicle should one such listing become available prior to the start of the currently secured parking space. If such a listing is found, a user may be presented with an option to secure a more suitable parking space for that user's needs, and may secure the parking space with little to no interaction with the wireless device. Listings may be filtered in situations such as when more suitable parking spaces are only slightly better (e.g., less than a predetermined threshold) or a more suitable parking space was already reserved recently (e.g., within a threshold time).

Some advantages of disclosed embodiments include providing listings to particular smartphone users as they arrive at a destination. For example, a smartphone user may have a destination entered in a navigation application. As the smartphone approaches the destination, the location may be tracked. A particular listing may be booked in advance or as the smartphone nears the destination. The listing may be swapped out for a more suitable listing as the smartphone approaches the destination, and the destination time is updated.

Figure 6:
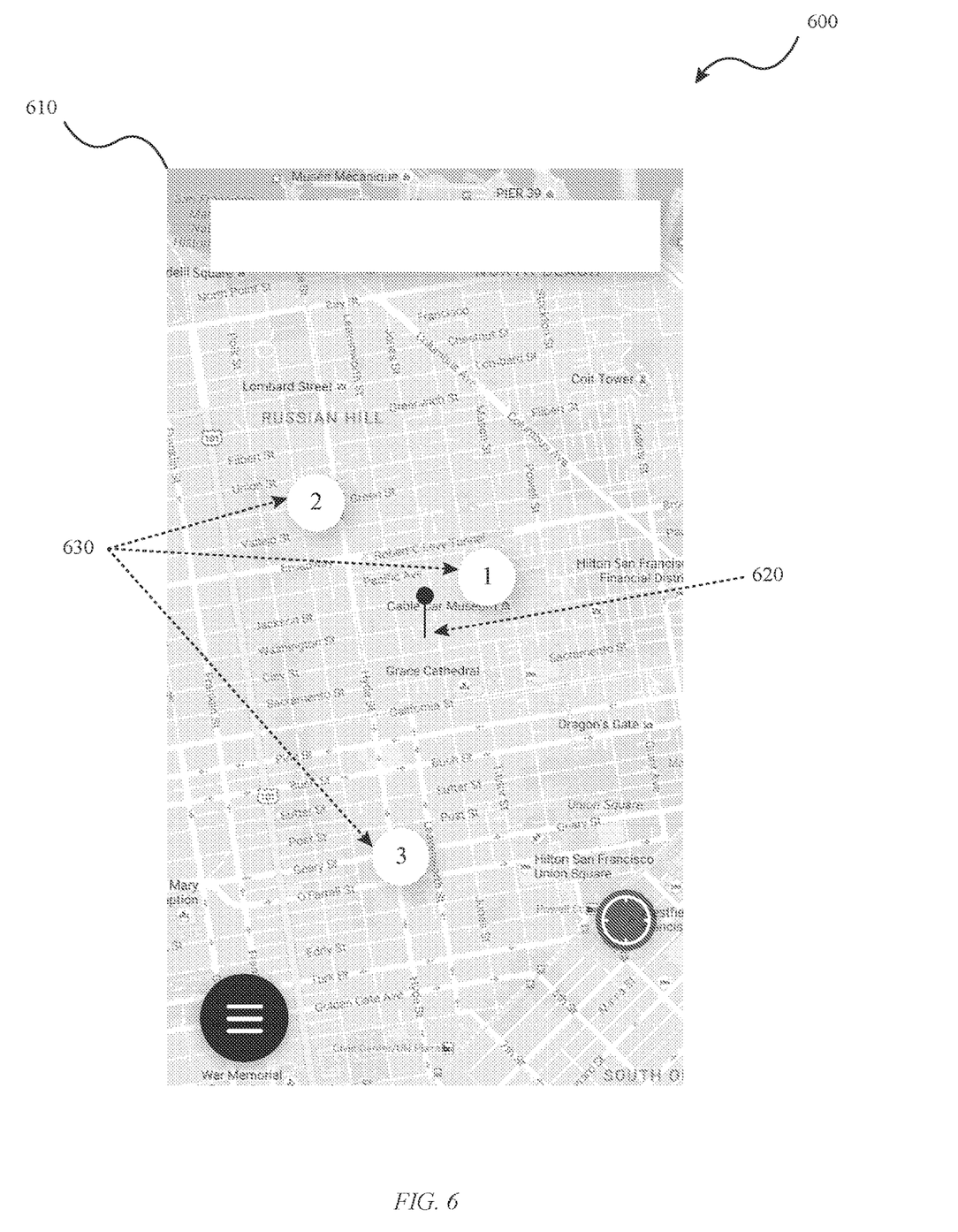
FIG. 6 is an example system illustrating conceptually how listings may be ranked for a first user device.

FIG. 6 is an example diagram 600 illustrating conceptually how listings may be ranked for a first user device, represented on a GUI 610. In some examples, GUI 610 may be displayed on a first wireless device, which may correspond to one or more of computing devices 110, 140, 170, media device 210, vehicle media device 220, and/or system 300. In some examples, GUI 610 includes a map with a plurality of GUI objects that represent individual listings 630 and a point-of-interest 620. In some examples, GUI 610 depicts listings 630 that are available and the relative ranking of listings 630. Listings 630 include one or more parking spaces available for parking. In some examples, each one of the listings 630 may include one or more listing parameters discussed above with respect to FIGS. 3-5. Based on the listing parameters, respective listing values for each of listings 630 may be determined in a manner similar to process 510. In some examples, the closest listing of the listings 630 may be ranked first, and have the highest listing value of listings 630. A little further from point-of-interest 620 is the listing ranked second, and the furthest listing of listings 630 being ranked the lowest as the third. In some examples, listings 630 may be differently ranked than depicted in FIG. 6. In some examples, the rankings are different than depicted in FIG. 6 because of the relative importance of one or more parameters other than distance, e.g., price or user rating.

In some embodiments, point-of-interest 620 may be determined based on listing requests being above a first threshold and may be based on traffic data. In some examples, point-of-interest 620 may be defined as a geographical location with a predefined proximity to location of an event being or to be held. In some examples, a sports bar may be considered a point-of-interest around 7 pm on a Friday night, because the sport bar will offer a live broadcast of a baseball event at 8 pm that same Friday night. A street intersection may be considered a point-of-interest between 8 am to 12 pm on a Sunday morning, because a farmer market is often held at the street intersection during that time frame. In some examples, the first threshold may be exceeded when the traffic data indicates heavy traffic in a region. The point-of-interest can be a location or venue causing a surge or sudden increase in demand for parking within a vicinity of the point-of-interest. In some examples, the point-of-interest can include a sports stadium, a concert hall, a nightclub, a movie theater, a museum, or a restaurant, farmer's market, a political gathering, or a parade route and/or the like and/or a combination thereof.

Some advantages of disclosed embodiments include an increase in overall parking quality. While price may be an important factor, it may not be dispositive for many users with smartphones looking for parking. A smartphone user may be approaching a point-of-interest 620, and may be looking for parking near the destination, and would like to minimize walking, but also park in a secure location. Based on the relative ranking of parking spaces, the space ranked first may be selected. The parking space may be selected automatically, saving the user the hassle with having to inspect the parking spaces. Such embodiments may increase efficiency with respect to parking, reduce traffic, reduce accidents, diminish or eliminate the need for vehicle operator (i.e., user) input, more accurately predict parking needs, and lead to faster processing of parking transactions. Traffic may be decreased by shortening the time spent looking for parking for drivers because less cars will be on the road looking for parking.

Figure 7:
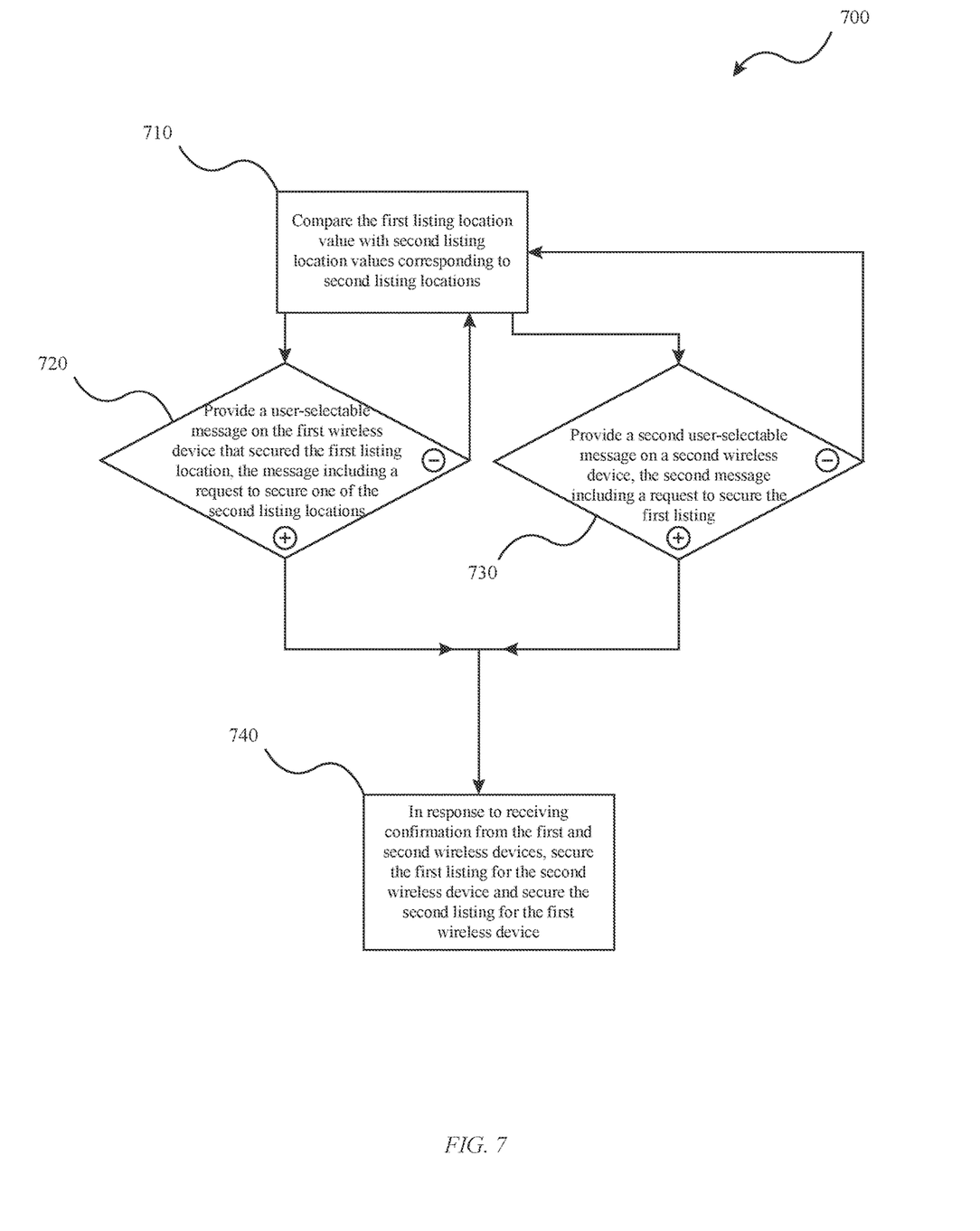
FIG. 7 is a flowchart illustrating an example method for determining listings with increased listing value and facilitating a mutual exchange of secured listings.

FIG. 7 is a flowchart illustrating an example method 700 for determining listings with increased listing value and facilitating a mutual exchange of secured listings. In some examples, one or more of processes for method 500 may be incorporated as part of method 700. In some examples, processes 710-740 may be implemented on one or more application servers, such as application servers 230. In some examples, not all of the illustrated processes may be performed in embodiments of method 700. Additionally, one or more processes not expressly illustrated in FIG. 7 may be included before, after, in between, or as part of processes 710-740. In some embodiments, one or more processes 710-740 may be implemented, at least in part, in the form of executable code stored on non-transitory, tangible, computer readable media that when run by one or more processors (e.g., a processor of the media device) may cause the one or more processors to perform one or more of processes 710-740. In some examples, the first wireless device may correspond to one or more of computing devices 110, 140, 170, media device 210, and/or vehicle media device 220, one or more sensors may include those sensors discussed above with respect to FIG. 2, and system 300.

During a process 710, a first listing value is compared with one or more second listing values corresponding to one or more second listings. In some examples, process 710 corresponds with process 520.

During a process 720, a first user-selectable message is provided on a first wireless device that secured a first listing, the first message including a request to secure a second listing that is secured by a second wireless device. In some examples, process 720 may correspond with process 540. In some examples, a confirmation from the first wireless device may be received. In some examples, no confirmation is received from the first wireless device and process 710 is repeated.

During a process 730, a second user-selectable message is provided on the second wireless device, the second message including a request to secure the first listing—the one secured by the first wireless device. In some examples, the first listing value of the first listing may be less than the second listing value of the second listing for the second wireless device. In some examples, to encourage the second wireless device to trade listings with the first wireless device, the second wireless device may be provided with one or more incentive options, such as a coupon, credit boarding pass, event ticket, voucher, store card, credit card, loyalty card, debit card, and/or the like and/or combinations thereof. In some examples, the incentives may be proportional to a distance from the destination or time before the reservation. In some examples, the incentive may be a 20% bonus credit because the second wireless device traded listings at least 15 minutes before the reservation. In some examples, no confirmation is received from the first wireless device or second wireless device and process 710 is repeated.

During a process 740, in response to receiving confirmation from both the first wireless device and the second wireless device, the first listing is secured for the second wireless device and second listing is secured for the first wireless device. In some examples, weights may be adjusted as discussed above with respect to process 550. In some examples, one listing parameter may include one or more incentive options. In some examples, if a user accepts a trade for a lower valued listing with one or more particular incentive options, the weight associated with the incentive option may be adjusted.

In some aspects, as a condition for a trade between two users for listing locations, one user may be required to wait with their vehicle at a listing location until the second user arrives with their vehicle. An additional incentive may be provided to the user required to wait in order to encourage compliance.

In some aspects, a listing value may be weighted with some accounting for the level of parking enforcement presence. Parking enforcement may be provided by a vendor or may be crowdsourced. In some examples, a user may be local to a listing and act as parking enforcement by reporting the occupancy of the vehicle in the listing. The user may take a picture or scan the license plate of the vehicle occupying the listing and transmit the image to the one or more application servers. If a license plate number is not found in the database of the one or more application servers, the owner or operator of the listing may be notified. Depending on the responsiveness of enforcement to cause the vehicle to be moved, the listing's value may be increased or decreased, for instance, if the time to move the vehicle from the time of notification is greater or less than 45 minutes.

Some advantages of disclosed embodiments include facilitating a swapping of listing reservations between users. Such technology may provide an overall benefit to each user involved in the transaction. Other benefits are discussed above with respect to FIGS. 4-6.

As discussed above and further emphasized here, FIGS. 1-7 are merely examples, and should not unduly limit the scope of the claims. Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

In the foregoing description, specific details are set forth describing some embodiments consistent with the present disclosure. It will be apparent, however, to one skilled in the art that some embodiments may be practiced without some or all of these specific details. The specific embodiments disclosed herein are meant to be illustrative, but not limiting. Phrases including "such as" and "for example" are intended to be non-exclusive, and not limit embodiments to the set of things listed within those phrases. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional. Furthermore, other patents and patent applications may be incorporated by reference in order to avoid unnecessary description; the present disclosure's terms and definitions should take precedence over any terms and definitions used in such references, when in conflict with the present disclosure.

For purposes of this disclosure, a wireless device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a wireless device may be a personal computer, a portable digital assistant (PDA), a consumer electronic device, a display device or monitor, a smartphone, or any other suitable device and may vary in size, shape, performance, functionality, and price. The wireless device may include memory, one or more processing resources such as a central processing unit (CPU) or hardware or software control logic. Additional components of the wireless device may include one or more storage devices, one or more communications ports for communicating with external devices as well as various input and output (I/O) devices, such as a keyboard, a mouse, a touchscreen, button inputs, a microphone, a motion sensor, and/or a video display.

What is claimed is:

1. A system comprising:
   a non-transitory memory; and
   one or more processors, coupled to the non-transitory memory and configured to execute instructions to perform operations comprising:
   receiving a listing search request from a first user device, the listing search request including one or more listing parameters;
   securing a first listing for the first user device based on the listing search request, the first listing being selected from a database including a plurality of listings;
   determining a first listing value is based on one or more listing parameters associated with the first listing;
   determining a second listing value based on one or more listing parameters associated with a second listing, wherein the second listing is selected from the database and secured by a second user device;
   determining that the second listing value is greater than the first listing value by a predefined value; and
   in response to a determination that the second listing value is greater than the first listing value by the predefined value,
   transmitting a first user-selectable message to the first user device, the first user-selectable message comprising a prompt configured to secure the second listing; and
   transmitting a second user-selectable message to the second user device, the second user-selectable message comprising a prompt configured to exchange the second listing with the first listing in response to input from the second user device, the message including an offer for a monetary incentive for the second user device to exchange the second listing with the first listing, wherein the first user-selectable message and the second user-selectable message include a deep link; and
   securing the first listing for the second user device and the second listing for the first user device in response to receiving confirmation from both the first user device and the second user device.

2. The system of claim 1, wherein activation of the deep link includes launching to a relevant portion of an application running on the first user device.

3. The system of claim 1, wherein the first user-selectable message may be activated as a result of input from the first user selected from the group consisting of touch, hand movement, and voice activation.

4. The system of claim 1, wherein each of the one or more listing parameters includes one or more selected from the group consisting of availability time, a type of listing, dimensions associated with listings, and a user rating.

5. The system of claim 1, wherein in response to the securing of the second listing, the one or more processors execute instructions that cause a second listing to be synchronized to a calendar event.

6. The system of claim 5, wherein the operations further comprise scheduling a ride using a ride sharing application corresponding to the calendar event.

7. The system of claim 1, wherein the operations further comprise partially or fully autonomously navigating a vehicle to a destination associated with the second listing.

8. The system of claim 1, wherein the monetary incentive includes one or more selected from the group consisting of coupon, credit boarding pass, event ticket, voucher, store card, credit card, loyalty card, and debit card.

9. A computer-implemented method comprising:
   receiving a listing search request from a first user device, the listing search request including one or more listing parameters;
   securing a first listing for the first user device based on the listing search request, the first listing being selected from a database including a plurality of listings;
   determining a first listing value for a first listing based on one or more listing parameters associated with the first listing;
   determining a second listing value based on one or more listing parameters associated with a second listing, wherein the second listing is selected from the database and secured by a second user device;
   determining that the second listing value for a second listing is greater than the first listing value by a predefined value; and
   in response to a determination that the second listing value is greater than the first listing value by the predefined value,
   transmitting a first user-selectable message to the first user device, the first user-selectable message comprising a prompt configured to secure the second listing; and transmitting a second user-selectable message to the second user device, the second user-selectable message comprising a prompt configured to exchange the second listing with the first listing in response to input from the second user device, the user-selectable message including an offer for a monetary incentive for the second user device to exchange the first listing and the second listing, wherein the first user-selectable message and the second user-selectable message include a deep link; and securing the first listing for the second user device and the second listing for the first user device in response to receiving confirmation from both the first user device and the second user device.

10. The computer-implemented method of claim 9, wherein the deep link includes launching to a relevant portion of an application running on the first user device.

11. The computer-implemented method of claim 9, wherein the first user-selectable message may be activated as a result of receiving input from the first user selected from the group consisting of touch, hand movement, and voice activation.

12. The computer-implemented method of claim 9, wherein each of the one or more listing parameters includes one or more selected from the group consisting of availability time, a type of listing, dimensions associated with listings, and a user rating.

13. The computer-implemented method of claim 9, further comprising in response to the securing of the second listing, causing a second listing to be synchronized to a calendar event.

14. The computer-implemented method of claim 13, further comprising scheduling a ride using a ride sharing application corresponding to the calendar event.

15. The computer-implemented method of claim 9, further comprising:
autonomously navigating a vehicle to the destination associated with the second listing.

16. The computer-implemented method of claim 9, wherein the monetary incentive includes one or more selected from the group consisting of coupon, credit boarding pass, event ticket, voucher, store card, credit card, loyalty card, and debit card.

17. A non-transitory computer readable storage medium storing one or more programs, the one or more programs comprising instructions, which when executed by a computing system with one or more processors, cause the computing system to execute a method of:
receiving a listing search request from a first user device, the listing search request including one or more listing parameters;

securing a first listing for the first user device based on the listing search request, the first listing being selected from a database including a plurality of listings;

determining a first listing value based on one or more listing parameters associated with the first listing;

determining a second listing value based on one or more listing parameters associated with a second listing, wherein the second listing is selected from the database and secured by a second user device;

determining that the second listing value is greater than the first listing value by a predefined value; and in response to a determination that the second listing value is greater than the first listing value by the predefined value,
transmitting a first user-selectable message to the first user device, the first user-selectable message comprising a prompt configured to secure the second listing; and
transmitting a second user-selectable message to the second user device, the second user-selectable message comprising a prompt configured to exchange the second listing with the first listing in response to input from the second user device, the user-selectable message including an offer for a monetary incentive for the second user device to exchange the first listing and the second listing, wherein the first user-selectable message and the second user-selectable message include a deep link; and securing the first listing for the second user device and the second listing for the first user device in response to receiving confirmation from both the first user device and the second user device.

18. The non-transitory computer readable storage medium of claim 17, the method further comprising wherein in response to the securing of the second listing causes a second listing to be synchronized to a calendar event.

19. The non-transitory computer readable storage medium of claim 18, the method further comprising scheduling a ride using a ride sharing application corresponding to the calendar event.

20. The non-transitory computer readable storage medium of claim 17, the method further comprising partially or fully autonomously navigating a vehicle to the destination associated with the second listing.

21. The non-transitory computer readable storage medium of claim 17, wherein the deep link is a uniform resource identifier.

22. The non-transitory computer readable storage medium of claim 17, wherein the monetary incentive is based on a distance from a destination or time before a reservation.

* * * * *